US011389772B2

(12) United States Patent
Gao et al.

(10) Patent No.: US 11,389,772 B2
(45) Date of Patent: Jul. 19, 2022

(54) METHOD FOR SYNTHESIS OF FLEXIBLE MULTIFUNCTIONAL HIGH-VOIDAGE ULTRATHIN PE MEMBRANES (71) Applicant: THE HONG KONG UNIVERSITY OF SCIENCE AND TECHNOLOGY, Hong Kong (CN)

(72) Inventors: Ping Gao, Hong Kong (CN); Jin Li, Hong Kong (CN); Runlai Li, Hong Kong (CN); Qinghua Zhang, Hong Kong (CN); Qiao Gu, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 23 days.

(21) Appl. No.: 16/642,316

(22) PCT Filed: Dec. 18, 2018

(86) PCT No.: PCT/IB2018/001623
§ 371 (c)(1),
(2) Date: Feb. 26, 2020

(87) PCT Pub. No.: WO2019/123019
PCT Pub. Date: Jun. 27, 2019

(65) Prior Publication Data
US 2020/0360870 A1 Nov. 19, 2020

Related U.S. Application Data (60) Provisional application No. 62/708,613, filed on Dec. 18, 2017.

(51) Int. Cl.
*B01D 71/26* (2006.01)
*B01D 67/00* (2006.01)
(Continued)

(52) U.S. Cl.
CPC ......... *B01D 71/26* (2013.01); *B01D 67/0027* (2013.01); *B01D 67/0083* (2013.01);
(Continued)

(58) Field of Classification Search
CPC ................ B01D 71/26; B01D 67/0027; B01D 67/0083; B01D 69/02; B01D 69/122;
(Continued)

(56) References Cited

U.S. PATENT DOCUMENTS 3,823,210 A 7/1974 Shii et al.
5,205,974 A 4/1993 Bastiaansen et al.
(Continued)

FOREIGN PATENT DOCUMENTS

CN 1736813 A 2/2006
CN 102637891 A 8/2012
(Continued)

OTHER PUBLICATIONS

Wang, Q. et al., "Thermal runaway caused fire and explosion of lithium ion battery," *Journal of Power Sources*, 2012, 208:210-224, Elsevier B.V.
(Continued)

*Primary Examiner* — Krishnan S Menon
(74) *Attorney, Agent, or Firm* — Saliwanchik, Lloyd & Eisenschenk (57) ABSTRACT

Disclosed are a method of manufacturing a polyethylene membrane comprising: stretching a polyethylene film in a first direction during a first stretching; attaching a plurality of rods on side edges of the polyethylene film; attaching a tape on the polyethylene film; stretching the polyethylene film having the rods attached thereto in a second direction during a second stretching; and annealing the polyethylene film after the second stretching. The second direction can be a transverse direction of the first direction, and the first
(Continued)

stretching and the second stretching can be performed at the same (or higher) temperature and the same stretching speed as each other.

5 Claims, 8 Drawing Sheets (51) Int. Cl.
B01D 69/02 (2006.01)
B01D 69/12 (2006.01)
B29C 55/14 (2006.01)
B29C 63/00 (2006.01)
B29C 71/02 (2006.01)
C08J 5/18 (2006.01)
B29L 31/00 (2006.01)

(52) U.S. Cl.
CPC ........... B01D 69/02 (2013.01); B01D 69/122 (2013.01); B29C 55/14 (2013.01); B29C 63/0026 (2013.01); B29C 71/02 (2013.01); C08J 5/18 (2013.01); B01D 2323/08 (2013.01); B01D 2325/02 (2013.01); B01D 2325/04 (2013.01); B01D 2325/24 (2013.01); B01D 2325/44 (2013.01); B29C 2071/022 (2013.01); B29K 2023/06 (2013.01); B29K 2995/0053 (2013.01); B29L 2031/755 (2013.01); C08J 2323/06 (2013.01)

(58) Field of Classification Search
CPC ............ B01D 2323/08; B01D 2325/02; B01D 2325/04; B01D 2325/24; B01D 2325/44; B01D 2323/42; B01D 67/0086; B29C 55/14; B29C 63/0026; B29C 71/02; B29C 2071/022; B29C 63/02; C08J 5/18; C08J 2323/06; B29K 2023/06; B29K 2995/0053; B29L 2031/755; B32B 27/00
See application file for complete search history.

(56) References Cited

U.S. PATENT DOCUMENTS

| | | | |
|---|---|---|---|
| 6,475,666 B1 | 11/2002 | Takeuchi | |
| 6,566,012 B1* | 5/2003 | Takita | H01M 50/411 |
| | | | 429/254 |
| 6,749,961 B1 | 6/2004 | Nguyen et al. | |
| 8,795,565 B2 | 8/2014 | Wei | |
| 8,945,753 B2 | 2/2015 | Chen et al. | |
| 8,951,456 B2 | 2/2015 | Uehara et al. | |
| 9,225,036 B2 | 12/2015 | Chang et al. | |
| 9,246,199 B2 | 1/2016 | Wang et al. | |
| 2003/0124279 A1 | 7/2003 | Sridharan et al. | |
| 2010/0313753 A1* | 12/2010 | Calis | B01D 39/2082 |
| | | | 95/45 |
| 2011/0223486 A1 | 9/2011 | Zhang et al. | |
| 2011/0241245 A1 | 10/2011 | Hiltner et al. | |
| 2012/0145468 A1 | 6/2012 | Pekala et al. | |
| 2013/0045412 A1* | 2/2013 | Takita | B01D 67/0027 |
| | | | 429/145 |
| 2013/0095353 A1 | 4/2013 | Li et al. | |
| 2015/0056399 A1 | 2/2015 | Takeoka et al. | |
| 2015/0079450 A1 | 3/2015 | Wensley et al. | |
| 2016/0204459 A1 | 7/2016 | Henkensmeier et al. | |
| 2017/0002156 A1* | 1/2017 | Chaen | H01M 8/1079 |
| 2018/0323417 A1* | 11/2018 | Xiao | H01M 50/449 |

FOREIGN PATENT DOCUMENTS

| | | |
|---|---|---|
| CN | 103943874 A | 7/2014 |
| CN | 105237856 A | 1/2016 |
| CN | 107415270 A | 12/2017 |
| EP | 2 891 677 A1 | 7/2015 |
| JP | 11-60790 A | 3/1999 |

OTHER PUBLICATIONS

Balakrishnan, P. G. et al., "Safety mechanisms in lithium-ion batteries," *Journal of Power Sources*, 2006, 155:401-414, Elsevier B.V.

Zhang, S. S., "A review on the separators of liquid electrolyte Li-ion batteries," *Journal of Power Sources*, 2007, 164:351-364, Elsevier B.V.

Ozawa, K., "Lithium-ion rechargeable batteries with $LiCoO_2$ and carbon electrodes: the $LiCoO_2/C$ system," *Solid State Ionics*, 1994, 69:212-221, Elsevier Science B.V.

Laman, F. C. et al., "Impedance Studies for Separators in Rechargeable Lithium Batteries," *J. Electrochem. Soc.*, Apr. 1993, 140(4):L51-L53, The Electrochemical Society, Inc.

Ilic, D. et al., "PoLiFlex™, the innovative lithium-polymer battery," *Journal of Power Sources*, 2004, 129:34-37, 2003 Elsevier B.V.

Schmidt-Rohr, K. et al., "Parallel cylindrical water nanochannels in Nation fuel-cell membranes," *nature materials*, Jan. 2008, 7:75-83, Nature Publishing Group.

Costamagna, P. et al., "Quantum jumps in the PEMFC science and technology from the 1960s to the year 2000 Part I. Fundamental scientific aspects," *Journal of Power Sources*, 2001, 102:242-252, Elsevier Science B.V.

Arcella, V. et al., "High Performance Perfluoropolymer Films and Membranes," *Ann. N.Y. Acad. Sci.*, 2003, 984:226-244, New York Academy of Sciences.

Hsu, W. Y. et al., "Ion Transport and Clustering in Nafion* Perfluorinated Membranes**," *Journal of Membrane Science*, 1983, 13:307-326, Elsevier Science Publishers B.V., Amsterdam.

Kreuer, K. D., "On the development of proton conducting polymer membranes for hydrogen and methanol fuel cells," *Journal of Membrane Science*, 2001, 185:29-39, Elsevier Science B.V.

Choi, P. et al., "Thermodynamics and Proton Transport in Nation II. Proton Diffusion Mechanisms and Conductivity," *Journal of The Electrochemical Society*, 2005, 152(3):E123-E130, The Electrochemical Society, Inc.

Rodgers, M. P. et at., "The effect of spatial confinement of Nation® in porous membranes on macroscopic properties of the membrane," *Journal of Membrane Science*, 2008, 321:100-113, Elsevier B.V.

Gierke, T. D. et al., "The Morphology in Nation* Perfluorinated Membrane Products, as Determined by Wide- and Small-Angle X-Ray Studies," *Journal of Polymer Science: Polymer Physics Edition*, 1981, 19:1687-1704, John Wiley & Sons, Inc.

Lin, J. et al., "Properties of Water in Prestretched Recast Nation," *Macromolecules*, 2008, 41:4284-4289, American Chemical Society.

Li, C. et al., "Casting Nafion-sulfonated organosilica nano-composite membranes used in direct methanol fuel cells," *Journal of Membrane Science*, 2006, 272:50-57, 2005 Elsevier B.V.

Byun, S. C. et al., "Effect of solvent and crystal size on the selectivity of ZSM-5/Nafion composite membranes fabricated by solution-casting method," 2006, 177:3233-3243, Elsevier B.V.

Miyake, N. et al., "Evaluation of a Sol-Gel Derived Nafion/Silica Hybrid Membrane for Polymer Electrolyte Membrane Fuel Cell Applications: II. Methanol Uptake and Methanol Permeability," *Journal of The Electrochemical Society*, 2001, 148(8):A905-A909, ECS—The Electrochemical Society.

Bauer, F. et al., "Influence of Temperature and Humidity on the Mechanical Properties of Nation® 117 Polymer Electrolyte Membrane," *Journal of Polymer Science: Part B: Polymer Physics*, 2005, 43:786-795, Wiley Periodicals, Inc.

Tang, Y. et al., "An experimental investigation of humidity and temperature effects on the mechanical properties of perfluorosulfonic acid membrane," *Materials Science and Engineering A*, 2006, 425:297-304, Elsevier B.V.

Falk, M., "An infrared study of water in perfluorosulfonate (Nation) membranes[1]," *Can. J. Chem.*, 1980, 58:1495-1501, National Research Council of Canada.

(56) References Cited

OTHER PUBLICATIONS

Weber, A. Z. et al., "Transport in Polymer-Electrolyte Membranes I. Physical Model," *Journal of The Electrochemical Society*, 2003, 150(7):A1008-A1015, The Electrochemical Society, Inc.
Sahu, A. K. et al., "Nation and modified-Nafion membranes for polymer electrolyte fuel cells: An overview," *Bull. Mater. Sci.*, Jun. 2009, 32(3):285-294, Indian Academy of Sciences.
Zhang, W. et al., "Crystallinity Enhancement of Nation Electrolyte Membranes Assisted by a Molecular Gelator," *Langmuir*, 2011, 27:9520-9527, American Chemical Society.
Zhang, W. et al., "Exfoliated Pt-Clay/Nafion Nanocomposite Membrane for Self-Humidifying Polymer Electrolyte Fuel Cells," *Langmuir*, 2008, 24:2663-2670, American Chemical Society.
Yildirim, M. H. et al., "Dimensionally stable Nafion-polyethylene composite membranes for direct methanol fuel cell applications," *Journal of Membrane Science*, 2008, 321:364-372, Elsevier B.V.
Hasegawa, H. et al., "Stress-strain measurement of ultra-thin polystyrene films: Film thickness and molecular weight dependence of crazing stress," *Polymer*, 2017, 123:179-183, Elsevier Ltd.
International Search Report dated Mar. 28, 2018 in International Application No. PCT/IB2017/001522.
International Search Report dated Jul. 16, 2019 in International Application No. PCT/IB2018/001623.

* cited by examiner

METHOD FOR SYNTHESIS OF FLEXIBLE MULTIFUNCTIONAL HIGH-VOIDAGE ULTRATHIN PE MEMBRANES

CROSS-REFERENCE TO RELATED APPLICATIONS

This application is the U.S. national stage application of International Patent Application No. PCT/IB2018/001623, filed Dec. 18, 2018; which claims the benefit of U.S. Provisional Patent Application Ser. No. 62/708,613, filed Dec. 18, 2017, each of which is hereby incorporated by reference in its entirety including any tables, figures, or drawings.

BACKGROUND

Free-standing polymer ultra-thin film is extremely difficult to prepare and to handle due to its (1) high surface energy and micro-scale effect along thickness direction, and (2) the usually weak mechanical integrity for ultra-thin or thin polymer films. However, conventional methods to prepare the ultra-thin film including spin coating, dip coating, self-assembly and electro-spinning will either need a substrate or an intermediate support, or they are extremely vulnerable when handled, while also having poor results on mechanical property tests by direct tensile experiments. Also, the resultant structures are usually in the form of being dense and non-porous. i.e., there are no current commercially available products could be simultaneous 1) freestanding (the integrity of the material could stably exist without a substrate or a supporting layer); 2) porous (consisting of the void-form structures that could connect through the thickness direction); and 3) ultrathin (homogeneous and has an average thickness less than 100 nm).

BRIEF SUMMARY

Embodiments of the subject invention provide novel and advantageous ultrathin polyethylene (PE) membranes that comprise biaxially oriented polymer chains with a thickness of about or less than 100 nm.

Embodiments of the subject invention also provide novel and advantageous methods of manufacturing ultrathin PE membranes that comprise a first hot stretching and a second hot stretching in a transverse direction, thereby providing a film that has a super-high mechanical strength biaxially and that is ultra-thin. The method can include (1) modified gel film extrusion and (2) a new specially designed hot stretching along with post-stretching annealing to prepare ultra-thin ultra-high molecular weight polyethylene (UHMWPE) films. The low entanglement polymer gel extrusion is carried out by extruding swelling polymer solutions at solid contents low enough to ensure maximum drawability in the stretching process. A main advantage of the resultant films of this method is that they have super-high mechanical strength biaxially while simultaneously being ultra-thin.

In an embodiment of the subject invention, a polyethylene membrane can comprise biaxially oriented polymer chains, wherein a total thickness of the polyethylene membrane is less than 100 nm.

In another embodiment of the subject invention, a method of manufacturing a polyethylene membrane can comprise: stretching a polyethylene film in a first direction during a first stretching; and stretching the polyethylene film in a second direction during a second stretching, wherein the second direction is a transverse direction of the first direction.

In yet another embodiment of the subject invention, a method of manufacturing a polyethylene membrane can comprise: stretching a polyethylene film in a first direction during a first stretching; attaching a tape on the polyethylene film; stretching the polyethylene film in a second direction during a second stretching, and annealing the polyethylene film after the second stretching, wherein the second direction is a transverse direction of the first direction, and wherein the first stretching and the second stretching are performed at a same temperature or a higher temperature and a same stretching speed as each other.

In yet another embodiment of the subject invention, a method of manufacturing a polyethylene can comprise: stretching a polyethylene film simultaneously in two orthogonal directions at either the same or different speed.

DETAILED DESCRIPTION

Embodiments of the subject invention provide novel and advantageous ultrathin PE membranes that comprise biaxially oriented polymer chains and have a total thickness of less than 100 nm. Embodiments of the subject invention also provide novel and advantageous methods of manufacturing ultrathin PE membranes that comprise a first hot stretching and a second hot stretching in a transverse direction, thereby providing a film that has a super-high mechanical strength biaxially and that is ultra-thin.

In an embodiment, a method of manufacturing an ultrathin PE membrane comprises biaxial hot stretching, in particular, a first hot stretching and a second hot stretching in a transverse direction of that of the first hot stretching. A first direction of the first hot stretching can be across a second direction of the second hot stretching, and in certain embodiments the first direction can be perpendicular to the second direction.

Figure 1:
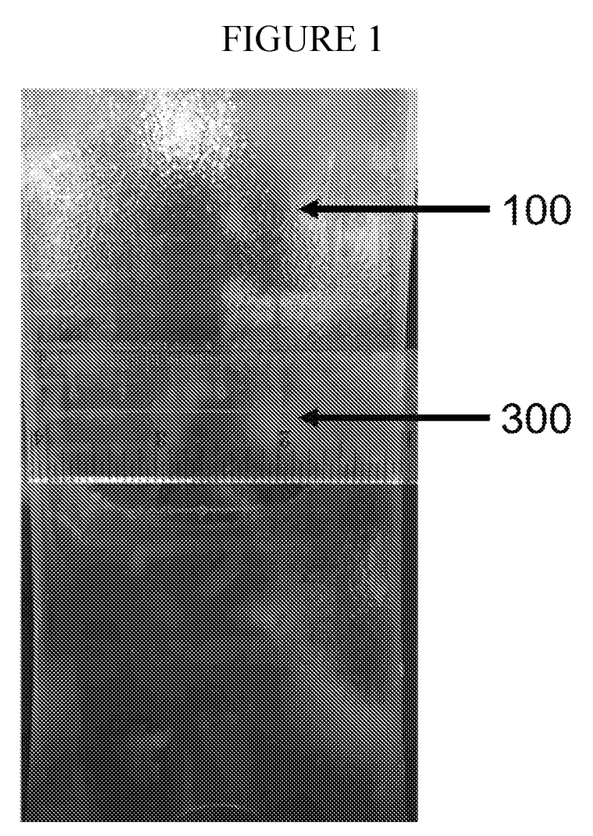
FIG. 1 shows a first hot stretching and its transverse shrinking of an ultrathin PE membrane according to an embodiment of the subject invention.

FIG. 1 shows a first hot stretching and its transverse shrinking of an ultrathin PE membrane according to an embodiment of the subject invention. Referring to FIG. 1, a PE film 100 is stretched in a first direction of the PE film 100 during a first hot stretching. The PE film 100 can be a gel type film. After the first hot stretching, no post-stretching annealing needs to be conducted. In addition, transverse constraining can be done by the installed PTFE tape 300 at edges of the PE film 100. The final transverse shrinkage rate can be measured to be 10%, as shown in FIG. 1. The first hot stretching is performed at a temperature of 100-130° C. and the stretching ratio can be between 10 and 180 times at a speed of 100-10000%/min. In a specific embodiment, the first hot stretching can be performed at a temperature of 120° C., and gauge length can be extended from 10 mm to 200 mm at a speed of 500%/min after 10 minutes of conditioning.

Figure 2:
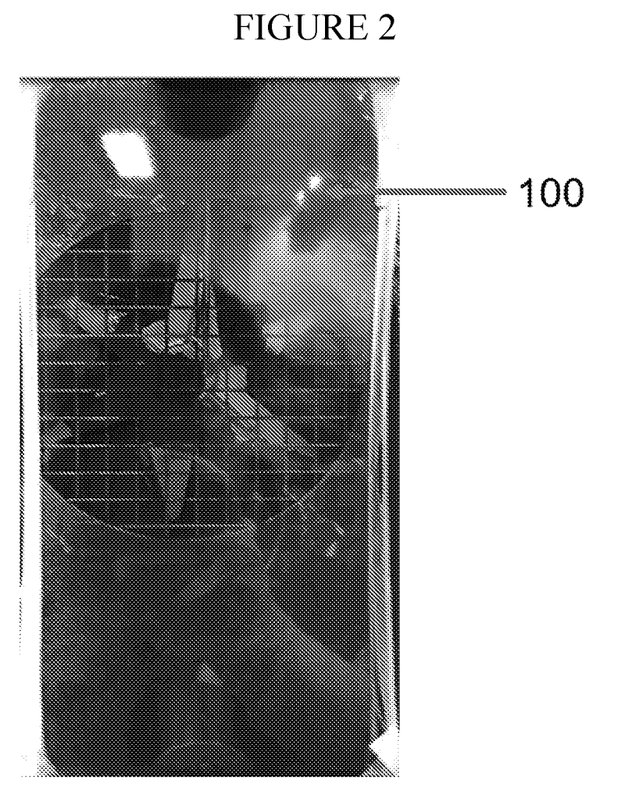
FIG. 2 shows a second hot stretching of an ultrathin PE membrane according to an embodiment of the subject invention.

FIG. 2 shows a second hot stretching of an ultrathin PE membrane according to an embodiment of the subject invention. Referring to FIG. 2, the PE film 100 is stretched in a second direction of the PE film 100 during a second hot stretching, wherein the second direction of the PE film 100 is transverse to the first direction of the PE film 100. That is, the PE film 100 is stretched in the first direction during the first hot stretching and then stretched in the second direction during the second hot stretching. The gauge length, temperature, and stretching speed during the second hot stretching can be the same as those of the first hot stretching or the temperature can be higher than the first hot stretching. While there is no post-stretching annealing after the first hot stretching, a post-stretching annealing can be performed right after the second hot stretching; for example, a post-stretching annealing can be performed at a temperature of 100-145° C. (e.g., for 5-15 minutes).

Transverse shrinking can become significant during the second hot stretching and yield rate may not be 20% during the second hot stretching. To overcome the serious transverse shrinking during the second hot stretching and reduce failure possibilities, the PTFE tape 300 can be used similar to the first hot stretching of FIG. 1. As a result, the transverse shrinking is significantly reduced. The shrinking rate is less than 5% after stretching and post-stretching annealing.

Figure 3:
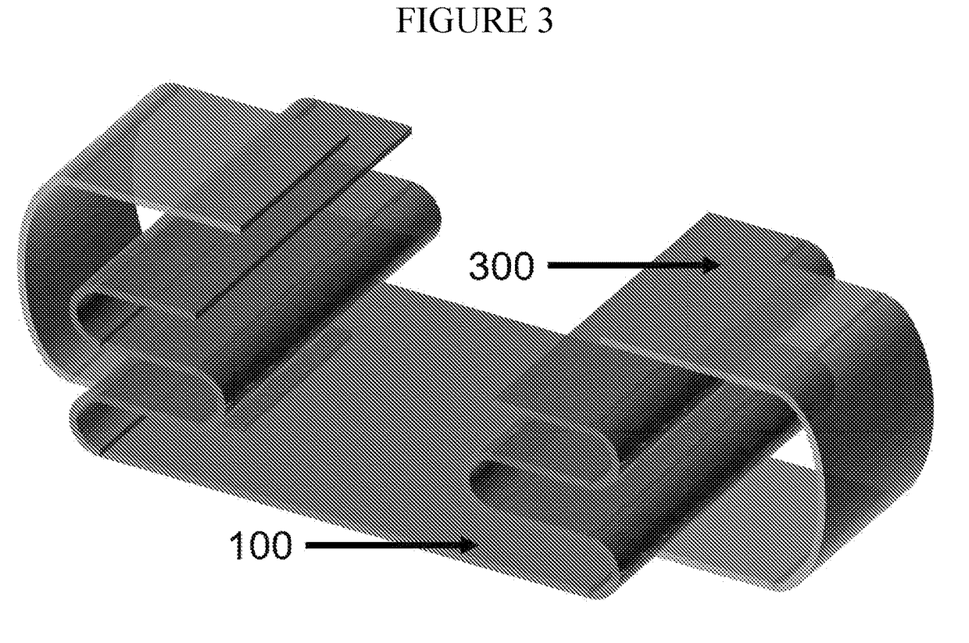
FIG. 3 shows a method to constrain membranes during hot stretching, schematic illustration of polytetrafluoroethylene (PTFE) tapes installed on PE films.

FIG. 3 shows a method to constrain membranes during hot stretching, including schematic illustration of PTFE tapes installed on PE films. In addition, the PTFE tape 300 can be replaced by other elastic tapes. PTFE tapes can be replaced by other elastomers such as polydimethylsiloxane (PDMS).

Methods of embodiments of the subject invention can comprise (1) modified gel film extrusion and (2) a new specially designed hot stretching along with post-stretching annealing to prepare ultra-thin UHMWPE films. The resultant films (i.e., ultrathin PE membranes) have super-high mechanical strength biaxially while simultaneously being ultra-thin (e.g., thickness of about or less than 100 nm). The maximum stress of the film reaches up to 1000 MPa, which is over two times stronger than stainless steel. The ductility of the film reaches up to 100%. By taking the density difference between polyethylene and steel and porosity of the film into consideration, the specific strength of UHMWPE ultra-thin film is over twenty times higher than that of stainless steel. In addition, the ultra-thin film also has many other advantages, such as being waterproof, gas-permeable, and extremely transparent (UV-vis transmission at 200 nm can be higher than 50%, while at 1100 nm the transmittance is around 98.5%).

Methods of embodiments of the subject invention provide preparation of an ultra-thin film made of ultra-high molecular weight polyethylene, and the resulting ultrathin film can include the following technical features:

(1) ultra-thin thickness below 100 nanometers;
(2) free-standing (i.e., it can be handled without any substrate);
(3) biaxially oriented, which means its polymer chain orientation is isotropic/or anisotropic if desired in a two-dimensional plane perpendicular to the thickness direction;
(4) highly porous, with a pore diameter of 5-100 nm;
(5) maximum stress of 1000 MPa and a Young's Modulus of between 500 MPa to 10,000 MPa.

Figure 4:
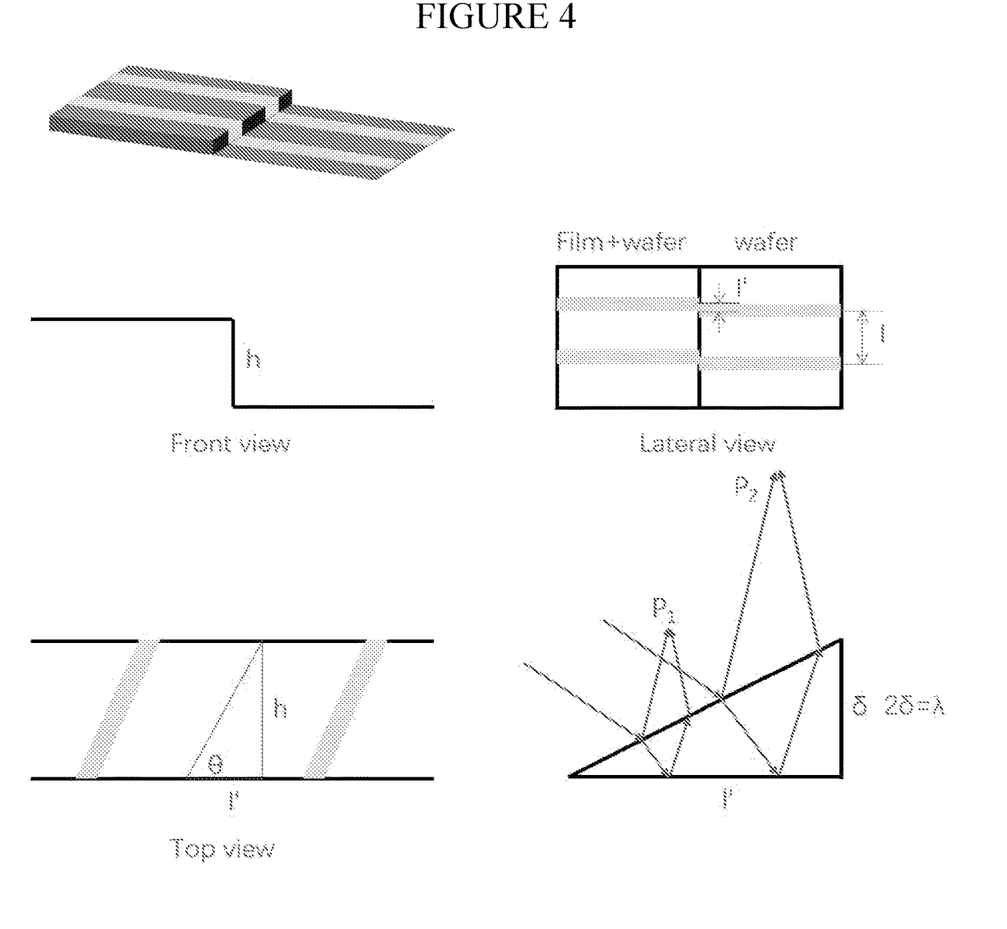
FIG. 4 shows a schematic model of light interference on a film and a wafer.
Figure 5:
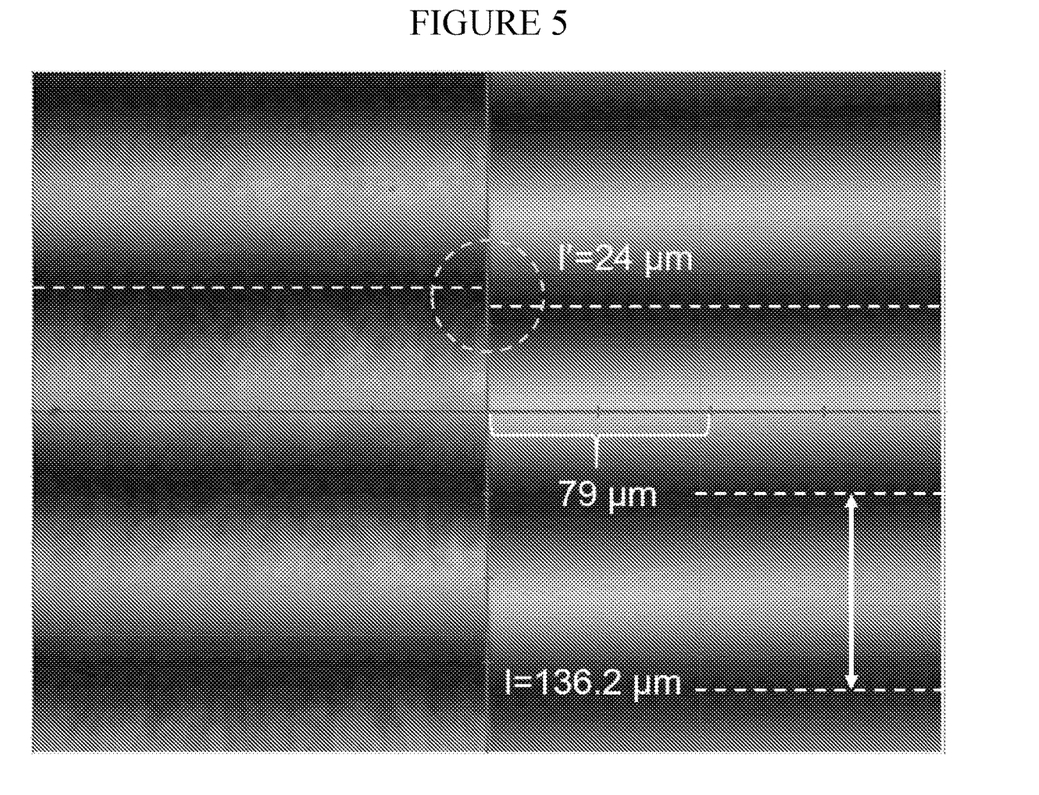
FIG. 5 shows a utilization of fringe (destructive phase interaction) shift due to a film, to calculate thickness.

In many embodiments, the ultrathin PE membrane has a thickness of less than 100 nm while being a free-standing film. The thin thickness of the ultrathin PE membrane can be measured by light interference (i.e., optical profiler). The thickness of UHMWPE thin/ultra-thin films can be determined by light interference and UV-vis spectrometry synergistically. FIG. 4 shows a schematic model of light interference on a film and a wafer, and FIG. 5 shows utilization of fringe shift due to the film to calculate thickness. Referring to FIGS. 4 and 5, the film is disposed on the wafer, and the thickness is calculated using light interference based on the top-surface altitude difference between films and the silicon wafer underneath.

Figure 6:
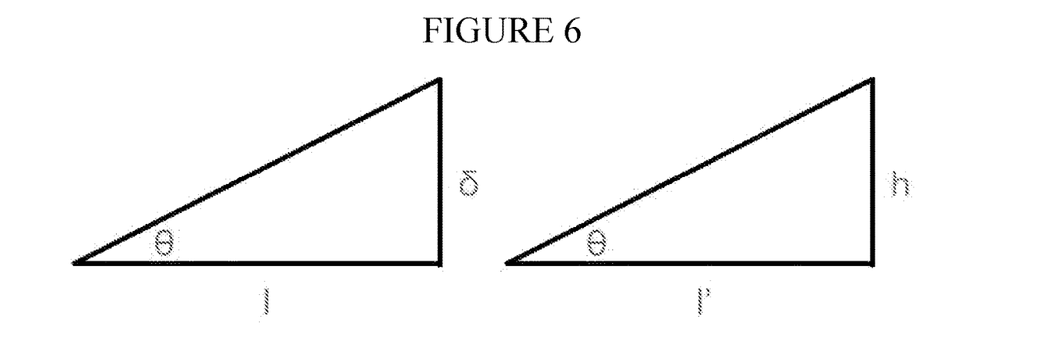
FIG. 6 shows a theoretical basis for the calculation of the thickness of an ultrathin PE membrane according to an embodiment of the subject invention.

FIG. 6 shows a theoretical basis for the calculation of the thickness of an ultrathin PE membrane according to an embodiment of the subject invention. Referring to FIGS. 4-6, for destructive phase interaction, the light path difference is:

$$\delta = \frac{(2k+1)}{2}\lambda,$$

where $\delta$ is the light path difference, k is a natural number, and $\lambda$ is the wavelength of incident light that used. There are two similar triangles: one is formed by the fringes shift distance $l_{shift}$ and film thickness h; and the other is the distance between two neighboring fringes l, and the light path difference.

The assumptions for the calculation are as follows.

(1) The shift of fringes is only $1^{st}$ order, i.e., the shift distance could be:

$$l_{shift} = nl + l',$$

where $l_{shift}$ is the actual shift distance between a fringe on the film and its original fringe on the wafer, and n is a natural number. Here, it is taken as $l_{shift} = l'$; later the equation is revisited and used to verify the assumption.

(2) The used wavelength is 532 nm. The measurement uses narrow band green light for the measurement. For green light, 532 nm is taken as its wavelength, and afterwards the validity of this assumption is checked.

Thus, for neighboring destructive fringes, the light path difference is (k=1):

$$\delta = \frac{\lambda}{2} = \frac{532 \text{ [nm]}}{2} = 266.3 \text{ [nm]}$$

$$\tan\theta = \frac{\delta}{l} = \frac{h}{l'}$$

$$h = l'\frac{\delta}{l} = \frac{24 \text{ [μm]} \cdot 266.3 \text{ [nm]}}{136.2 \text{ [μm]}} = 46.9 \text{ [nm]}$$

In addition, the assumptions for inspections are as follows. If it is not a first order shift, the thickness is thus almost doubled or even tripled, according to the number of order shifted, but the system is designed to apply a theta sweep to determine the thickness itself by adjusting the distance between the sample and the light source. The system measured result is an AFM-analogous form, and the height difference between a film and a wafer can be read on each point. This is the advantage, while the disadvantage is that the overall thickness of the film cannot be calculated precisely.

Figure 7:
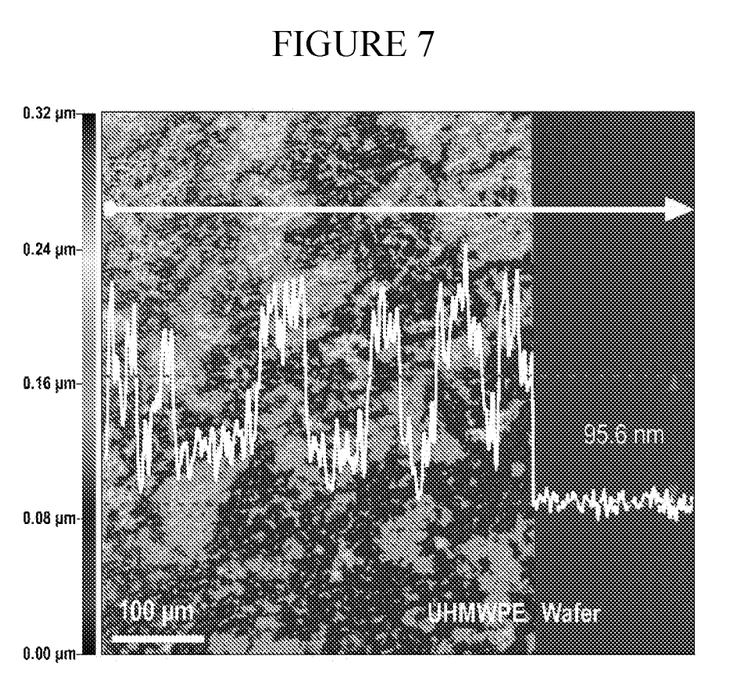
FIG. 7 shows Optical profiler results

FIG. 7 shows machine-generated interference results of an ultra-thin film according to an embodiment of the subject invention. Referring to FIG. 7, the machine-generated result serves as a double confirmation to check the order of magnitude of the thickness. That is, the recovered roughness of the film by the machine is demonstrated in FIG. 7. The average height difference is around 50 nm, suggesting that assumption (1) above is valid.

Figure 8:
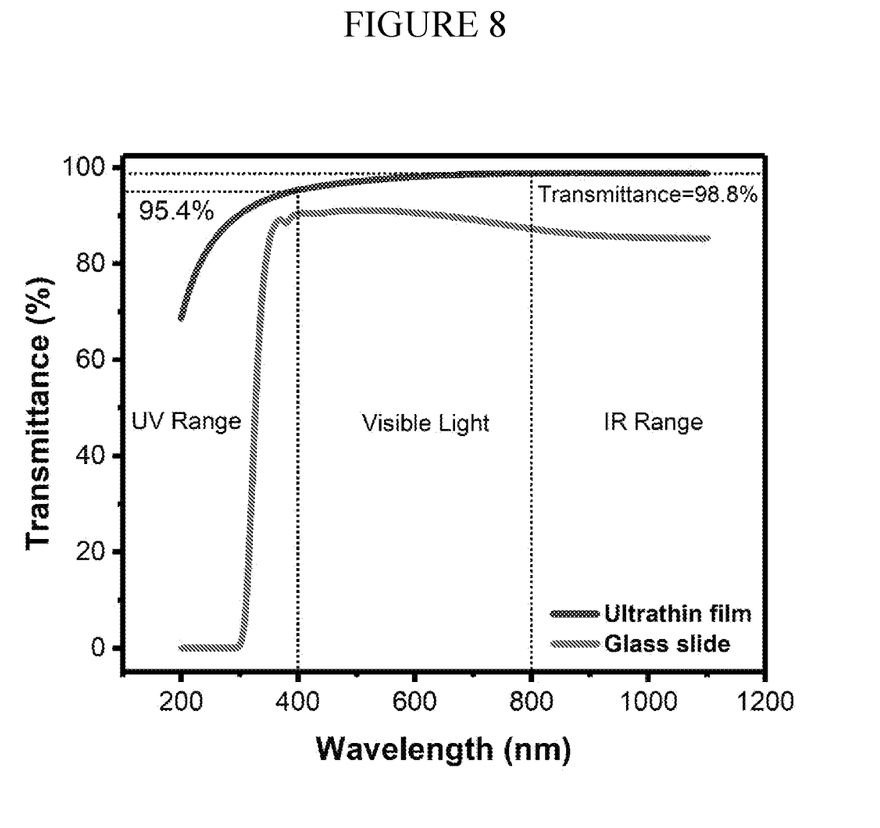
FIG. 8 shows a UV-vis Photospectrometer transmittance result of an ultra-thin UHMWPE film compared with a glass slide according to an embodiment of the subject invention.
Figure 9:
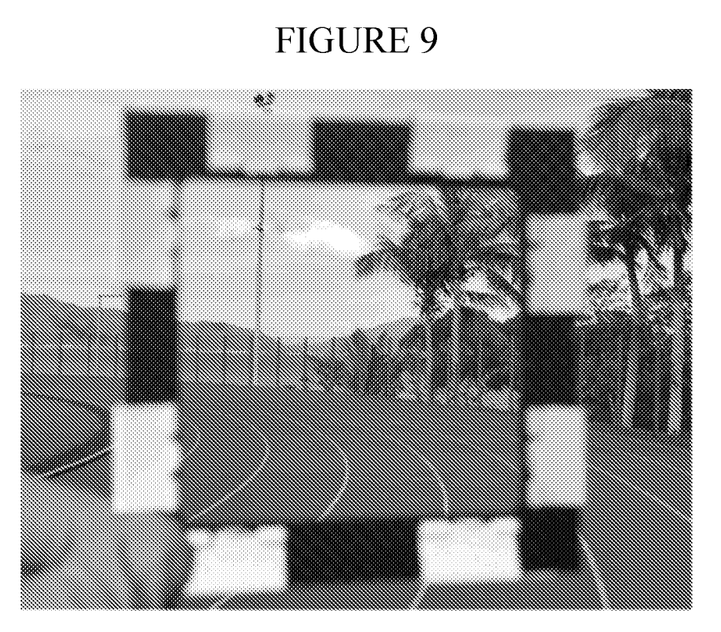
FIG. 9 shows a demonstration of high optical transparency and free-standing ability of an UHMWPE ultra thin film according to an embodiment of the subject invention.

FIG. 8 shows a UV-vis photospectrometer transmittance result of an ultra-thin UHMWPE film according to an embodiment of the subject invention, and FIG. 9 shows a demonstration of the transmittance and free-standing ability of an UHMWPE ultra thin film according to an embodiment of the subject invention. Referring to FIGS. 8 and 9, the methods of embodiments of the subject invention provide ultrathin PE membranes that are free-standing, ultrathin, and transparent.

The subject invention includes, but is not limited to, the following exemplified embodiments.

Embodiment 1. A polyethylene membrane, comprising:
a plurality of biaxially oriented polymer chains,
wherein a thickness of the polyethylene membrane is 100 nanometers (nm) or less (or about 100 nm or less).

Embodiment 2. The polyethylene membrane according to embodiment 1, wherein orientations of the polymer chains are isotropic in a two-dimensional plane perpendicular to a direction of the thickness of the polyethylene membrane.

Embodiment 3. The polyethylene membrane according to embodiment 1, wherein orientations of the polymer chains can exhibit preferentially higher orientation in one of the plane direction perpendicular to a direction of the thickness of the polyethylene membrane.

Embodiment 4. The polyethylene membrane according to any of embodiments 1-3, wherein the polyethylene membrane comprises a plurality of pores with a pore diameter in a range of 5 nm to 100 nm.

Embodiment 5. The polyethylene membrane according to any of embodiments 1-4, wherein the polyethylene membrane is a free-standing film.

Embodiment 6. The polyethylene membrane according to any of embodiments 1-5, wherein the polyethylene membrane has a maximum stress of at least 300 mega-Pascal (MPa).

Embodiment 7. The polyethylene membrane according to any of embodiments 1-6, wherein the polyethylene membrane has a Young's Modulus of at least 500 MPa.

Embodiment 8. The polyethylene membrane according to any of embodiments 1-7, wherein the polyethylene membrane has a UV-vis transmittance of at least 50% with respect to 200 nm wavelength light.

Embodiment 9. The polyethylene membrane according to any of embodiments 1-8, wherein the polyethylene membrane has a UV-vis transmittance of at least 95% with respect to 1100 nm wavelength light.

Embodiment 10. A method of manufacturing a polyethylene membrane, the method comprising:
stretching a polyethylene film in a first direction during a first stretching; and
stretching the polyethylene film in a second direction during a second stretching,
wherein the second direction is a transverse direction of the first direction.

Embodiment 11. The method according to embodiment 10, further comprising performing a post-stretching annealing of the polyethylene film after the second stretching.

Embodiment 12. The method according to any of embodiments 10-11, further comprising, after the first stretching and before the second stretching, attaching a plurality of elastic films on side edges of the polyethylene film, including attaching a first elastic film on a first side edge of the polyethylene film and a second elastic film on a second side edge of the polyethylene film.

Embodiment 13. The method according to embodiment 12, wherein the plurality of elastic films are made of an elastomer including for example one of polytetrafluoroethylene (PTFE) or polydimethylsiloxane (PDMS) or the like.

Embodiment 14. The method according to any of embodiments 10-13, further comprising, after the first stretching and before the second stretching, attaching a tape on the polyethylene film.

Embodiment 15. The method according to any of embodiments 10-14, further comprising, before the first stretching, attaching a tape on the polyethylene film.

Embodiment 16. The method according to any of embodiments 10-15, wherein the first stretching is performed at a temperature of 100-130° C.

Embodiment 17. The method according to any of embodiments 10-16, wherein the polyethylene film is stretched in the first direction such that the stretching ratio of the polyethylene film is between 10 and 180 times at a speed of 100-10000%/min.

Embodiment 18. The method according to any of embodiments 10-16, wherein, during the first stretching, a gauge length of the polyethylene film is extended from 10 mm to 200 mm at a speed of 500%/min after 10 minutes of conditioning.

Embodiment 19. The method according to any of embodiments 10-18, wherein the second stretching is performed at a same temperature as or higher temperature than the first stretching.

Embodiment 20. The method according to any of embodiments 10-19, wherein the second stretching is performed at a same stretching speed as the first stretching.

Embodiment 21. The method according to any of embodiments 11-20, wherein the post-stretching annealing is performed at a temperature of 100-145° C. for 5-15 minutes.

Embodiment 22. The method according to any of embodiments 10-21, wherein the second stretching is performed after the first stretching without any annealing performed before the second stretching.

Embodiment 23. The method according to any of embodiments 10-22, wherein the first stretching and the second stretching are performed simultaneously biaxially.

Embodiment 24. A method of manufacturing a polyethylene membrane, the method comprising:
stretching a polyethylene film in a first direction during a first stretching;
attaching a plurality of elastic films on side edges of the polyethylene film, including attaching a first film on a first side edge of the polyethylene film and a second film on a second side edge of the polyethylene film;
stretching the polyethylene film, having the plurality of elastic films attached thereto, in a second direction during a second stretching; and
annealing the polyethylene film after the second stretching,
wherein the second direction is a transverse direction of the first direction,
wherein the second stretching is performed at a same (or higher) temperature as (or than) the first stretching, and
wherein the second stretching is performed at a same stretching speed as the first stretching.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

What is claimed is:

1. A polyethylene membrane, comprising:
   a plurality of biaxially oriented polymer chains,
   wherein a thickness of the polyethylene membrane is 100 nanometers (nm) or less,
   wherein the polyethylene membrane comprises a plurality of pores with a pore diameter in a range of 5 nm to 100 nm,
   wherein the polyethylene membrane is a free-standing film, and
   wherein the polyethylene membrane has an ultimate tensile stress of at least 300 mega-Pascal (MPa).

2. The polyethylene membrane according to claim 1, wherein orientations of the polymer chains are isotropic in a two-dimensional plane perpendicular to a direction of the thickness of the polyethylene membrane.

3. The polyethylene membrane according to claim 1, wherein orientations of the polymer chains in a two-dimensional plane are perpendicular to a direction of the thickness of the polyethylene membrane.

4. The polyethylene membrane according to claim 1, wherein the polyethylene membrane has a Young's Modulus of at least 500 MPa.

5. The polyethylene membrane according to claim 1, wherein the polyethylene membrane has a UV-vis transmission of at least 50% with respect to 200 nm wavelength light and at least 95% with respect to 1100 nm wavelength light.

* * * * *